Patented Dec. 17, 1935

2,024,568

UNITED STATES PATENT OFFICE 2,024,568

PROCESS OF PRODUCING PARA-COUMARONE RESINS

Karl Henry Engel, Leonia, N. J., assignor to The Barrett Company, New York, N. Y., a corporation of New Jersey No Drawing. Application July 20, 1932, Serial No. 623,601

18 Claims. (Cl. 260—7)

My invention relates to the production of resins from oils containing polymerizable constituents of styrene-coumarone-indene type and particularly to methods of producing high-grade resins characterized by their light color and high melting point.

Heretofore, in the production of resins commonly known as paracoumarone resin, naphtha containing polymerizable constituents of the styrene-coumarone-indene type has been treated with a polymerizing agent such as sulfuric acid. However, the resins thus obtained are frequently dark in color and of inferior quality. The discoloration of the resin is presumably due to the polymerization of certain constituents of the naphtha other than styrene, coumarone and indene which form dark substances under the influence of sulfuric acid. These objectionable substances are present in relatively small proportions and their removal will not affect the resin yield to an appreciable extent.

The production of paracoumarone resin by the action of polymerizing agents heretofore employed is also objectionable in that the reaction is difficult to control so as to obtain consistent results. For this reason it is often necessary to blend different oils or naphthas to produce an oil having a uniform amount of polymerizable constituents therein in order to obtain uniform results.

In accordance with my invention, tar oil containing polymerizable constituents of the coumarone-indene type is treated with a polymerizing agent which apparently possesses a selective action in polymerizing constituents of oils whereby light colored, high melting point paracoumarone resin is produced. Furthermore, my process may be used in producing resins from naturally occurring crude tar oils, that is, oils varying widely in their content of polymerizable constituents, with very satisfactory results. The polymerizing agent may also be employed in the preliminary treatment of oils to remove those constituents thereof which tend to darken resin prior to the polymerization of the light resin-forming constituents, such as styrene, coumarone and indene, present in the oil treated.

The reagent used in carrying out my process contains boric acid or the anhydride thereof either in the form of ortho-boric acid ($H_3BO_3$) or metaboric acid ($HBO_2$) or in the form of boron trioxide ($B_2O_3$ the anhydride of boric acid) together with sulfuric acid.

Among the objects of my invention are to produce high-grade paracoumarone resin characterized by a light color and high melting point, to reduce the discoloration of paracoumarone resins due to the polymerization of constituents other than the light resin-forming constituents, such as styrene, coumarone and indene, present in the oils treated, to provide a process which is readily controlled and comparatively stable in its action, and to effect the polymerization of constituents of the styrene-coumarone-indene type in oil containing the same by the action of a polymerizing agent comprising boric acid or the anhydride thereof as a constituent. These and other objects and features of my invention will appear from the following description thereof in which reference is made to specific examples typical of preferred procedure in accordance with my invention.

My process may be used in general in treating oils containing polymerizable constituents of the coumarone-indene type having a boiling point range varying from about 75° C. to 230° C. or higher and particularly tar oils and naphtha produced in coal gasification processes. The oils treated may be naturally occurring crudes having a high or low content of polymerizable constituents although the invention is equally applicable to the treatment of blended oils.

In carrying out the process the oil to be treated is first washed with a solution of caustic alkali or is otherwise treated to reduce the tar acid content thereof substantially below that ordinarily present in commercial "phenol-free" naphtha. The amount of tar acids present in the oil treated should be less than 0.1% of the oil and in most instances it is desirable to reduce the tar acid content to approximately .05% or less of the oil.

The temperature at which the reaction between the polymerizing agent and the oil takes place also controls to a large extent the color and melting point of the product obtained. For best results the temperature of the reaction should not exceed about 25° C. and preferably is maintained in the neighborhood of —10 to +20° C. The low temperature of the polymerizing treatment is known to favor the production of resins of high melting point. However, in my process low temperature also gives improvement in color of the resin produced.

The composition of the reagent employed for effecting the polymerization of constituents of coumarone and indene may be varied considerably, depending upon the nature of the oil being treated and the characteristics of the resin to be produced. In general, I prefer to use a mixture of sulfuric and boric acids in which the boric acid, either in the form of ortho- or meta-boric acid or boron trioxide is dissolved in concentrated sulfuric acid (92 to 96% H₂SO₄) although the concentration of the sulfuric acid may vary from about 82% to 100% H₂SO₄ if desired. The amount of boric acid or boron trioxide present in the mixture may be varied over a considerable range from about 1 to 15% or more by weight of the mixture. When more than 15% of boric acid is employed, the viscosity of the acid mixture is inconveniently high. For most purposes a mixture containing from 4 to 10% of boric acid is satisfactory.

Orthoboric acid introduces an appreciable quantity of water into the acid mixture. The water content of the sulfuric acid, as is well known, modifies the action of the acid, more dilute acids producing, in general, lower melting resins than the more concentrated acids. Where this effect of dilution of acids is not required, metaboric acid or boron trioxide are used. Since boron trioxide dissolves with difficulty in concentrated sulfuric acid, metaboric acid is the most convenient to use and consequently is preferred.

I have found that the action of the polymerizing agent varies to some extent with the concentration of the boric acid in the mixture. Thus, when using from 1 to about 6% of boric acid (metaboric) with from 99 to 94% of concentrated sulfuric acid (92 to 96% H₂SO₄), the color of the resin is progressively lighter, as more boric acid is used in the polymerizing reagent, the lightest resin being obtained with the highest concentration of boric acid. The melting points of the resins show a slight increase when the boric acid concentration exceeds 4%. When using from 6 to about 15% of boric acid (metaboric) with from 94 to 85% of concentrated sulfuric acid (92 to 96% H₂SO₄) the color of the resin is no longer further improved but the melting points rise progressively as more boric acid is used in the polymerizing reagent, the highest melting point being obtained with the highest concentration of boric acid. The most pronounced rise in the melting point of the resin, however, appears to occur in passing from the 6 to the 8% concentration of boric acid.

Percentage figures in connection with boric acid, refer to metaboric acid. Orthoboric acid (H₃BO₃) or boron trioxide (B₂O₃) may be substituted for the metaboric acid (HBO₂), quantities corresponding to the equivalent weights being used, i. e. 62 parts of orthoboric acid, or 35 parts of boron trioxide being equivalent to 44 parts of metaboric acid.

The amount of the boric-sulfuric acid mixture employed in treating any oil is dependent primarily on the amount of polymerizable constituents in the oil. Usually when it is desired to polymerize substantially all of the light colored resin-forming constituents in the oil, the amount of the agent employed will vary with the content of polymerizable constituents in each oil. However, from 1 to 5 parts by weight of the polymerizing agent for 100 parts of an oil containing from 25% to 60% of polymerizable constituents will ordinarily give very satisfactory results.

If desired, the boric-sulfuric acid mixture may be used for pretreating oils containing constituents which tend to darken the resin. Oils given a preliminary treatment with the polymerizing agent in accordance with my invention may thereafter be polymerized with sulfuric acid alone or with other polymerizing agents to produce light colored resins from oils which would yield only dark or discolored resins if polymerized with sulfuric acid alone without being given any preliminary treatment. It has been proposed heretofore to pretreat naphtha containing resin darkening constituents with sulfuric acid alone. However, I find that the yield of light colored resin obtainable from oils when given a preliminary treatment with a boric-sulfuric acid mixture in accordance with my invention is materially higher than the yield obtainable from oils given a preliminary treatment with sulfuric acid alone. The amount of the polymerizing agent used in pretreating the oil may vary from a small fraction to 1 per cent of the weight of the oil treated.

Although it has been desirable heretofore to blend naphthas or tar oils in order to obtain an oil containing approximately 30 per cent of polymerizable constituents in order that the process will give consistent results, the resin obtained when using a mixture of boric and sulfuric acids such as that described above is substantially the same in color and melting point irrespective of the amount of polymerizable constituents present in the oil treated. This feature of my invention is of particular advantage in that naturally occurring crude tar oil, that is tar oils initially containing either a low or high amount of polymerizable constituents, may be treated to obtain high-grade light-colored resins. My invention thus obviates the necessary of selecting the naphtha to be treated or blending the same to produce naphtha or oil of uniform characteristics.

My invention is not limited by any particular theory with respect to the action of the agent employed. However, I believe the improvement in the color of the resin attending the use of a boric-sulfuric acid mixture in accordance with my invention is due to the formation of compounds or reaction products of the boric acid and the resin darkening constituents which compounds or reaction products are insoluble in the oil and thereby removed from the oil and polymerization products in carrying out the process.

In order that my invention will be clearly understood the following examples, typical of preferred methods of operating in accordance with my process, are cited by way of illustration.

*Example 1.*—4 parts by weight of ortho-boric acid (H₃BO₃) were dissolved in 96 parts by weight of concentrated sulfuric acid (95% H₂SO₄). A clear, practically water white coal tar fraction boiling at 160° to 205° C., containing 28.5% of polymerizable constituents and having a specific gravity of 0.920 was extracted to remove essentially all tar acids and tar bases; i. e. until the tar acids and bases each constituted only about 0.05% of the oil. The resin-forming constituents of the oil were then polymerized by adding in small proportions from 20 to 25 parts by weight of the boric-sulfuric acid mixture for every 1000 parts of the oil. The temperature of the reaction mixture was maintained within the limits of −5° to +20° C. during polymerization. After polymerization the mixture was allowed to settle and the greater part of the acid removed as a dark viscous sludge which apparently contained practically all of those bodies which tend to form dark-colored resins. The remaining traces of acid in the oil were neutralized and removed by washing with a water solution of alkalies and the resin isolated by distilling off the unpolymerized oil by distillation under reduced pressure. The resin thus obtained equaled 28.5% by weight of the oil treated and had a softening point of 128°

C. The resin was light yellow in color and transparent. By way of comparison the same oil was polymerized under identical conditions to those recited above using 95% sulfuric acid alone as the polymerizing agent. The resin obtained in the latter operation had substantially the same softening point as the boric sulfuric acid polymerized resin (128° C.) but had a dark, brownish color and was non-transparent in layers greater than $\frac{3}{16}$ inch in thickness. The foregoing example is illustrative of the improvement in color effected by the use of the boric-sulfuric acid reagent of the present invention.

*Example 2.*—8 parts by weight of meta-boric acid ($HBO_2$) were dissolved in 92 parts of 95% sulfuric acid. The method of procedure employed in using this form of the reagent was identical with that recited in Example 1, 20 to 25 parts of the latter boric-sulfuric acid mixture being used to effect polymerization of constituents of the oil. The same yield of resin was obtained in this example as in Example 1 and the resin had the same light yellow color as that of the resin produced in the previous example. However, the softening point of the resin obtained was 145° C., showing an increase in the softening point of 17° C. over that of the corresponding sulfuric acid polymerized resin. This example clearly indicates the marked improvement in softening point as well as color effected by the use of the boric-sulfuric acid reagent.

*Example 3.*—A freshly distilled water white fraction of drip oil boiling over the range from 78° C. to 218° C. with the major portion boiling between 135° C. and 200° C. sp. gr. 0.891 at 25° C., having a combined content of tar acids and tar bases of about 0.1% and containing 23.5% of polymerizable constituents, was treated with a mixture of 8 parts meta-boric acid ($HBO_2$) and 92 parts of 95% sulfuric acid as the polymerizing agent under the conditions recited in Example 1. A practically quantitative yield of the resin was obtained which was light yellow in color and transparent and which had a softening point of 112° C. In order to compare the results of this procedure with the use of sulfuric acid alone the same oil was treated under identical conditions using 95% sulfuric acid as the polymerizing agent. The resin obtained by the use of sulfuric acid alone had a somewhat deeper color and had a softening point of only 99° C.

*Example 4.*—In using the boric sulfuric acid mixture for pretreating naphtha to remove resin darkening constituents therefrom, a coal tar fraction boiling from 78° C. to 218° C. sp. gr. 0.938 at 25° C., and containing 35.5% of polymerizable constituents was treated to remove substantially all tar acids and bases, i. e., until the tar acids and bases together constituted about 0.1% of the oil. The oil was then dried and agitated for 30 minutes with a mixture containing 10 parts of meta boric acid and 90 parts of 95% sulfuric acid. 2.5 parts of the boric-sulfuric acid mixture were employed in treating 1000 parts of the oil. The treated oil was then separated from the acid, neutralized and distilled. The distillate thus obtained was polymerized with concentrated sulfuric acid alone in the usual manner producing a pale yellow, transparent resin. The yield of resin constituted 32.7% of the oil and 92% of the polymerizable constituents of the original oil. By way of comparison the same oil was treated with sulfuric acid alone under the same conditions but without pretreatment and a resin obtained which was brownish in color although transparent. A practically quantitative yield of resin was obtained. As a further comparison the oil described above was given a pretreatment with 2.5 parts of concentrated sulfuric acid per 1000 parts of oil to remove resin darkening constituents and thereafter the treated oil was polymerized with sulfuric acid to effect substantially complete polymerization of constituents thereof. The resin thus obtained was light yellow in color but the yield of the resin was materially lower than that produced by pretreatment of the oil with the boric sulfuric acid mixture, that is the yield obtained was only 29.5% of the oil or 83.7% of the total polymerizable constituents of the original oil.

The term "boric acid" as used throughout the specification and in the claims is intended to refer to either ortho- or meta-boric acid, or the anhydride thereof (boron trioxide $B_2O_3$).

Although I have described my invention as carried out in treating specific oils and under specific conditions of temperature and concentration of the boric acid in the boric-sulfuric acid mixture, I do not intend that my invention shall be limited by the examples cited except as defined by the claims.

I claim:

1. The method of producing light colored resins from oil containing polymerizable constituents of the styrene-coumarone-indene type which comprises the step of polymerizing the polymerizable constituents of said oil with a mixture of boric and sulfuric acids.

2. The method of producing light colored resins from oil containing polymerizable constituents of the styrene-coumarone-indene type which comprises the step of adding to oil having a tar acid content below about .10 per cent a mixture of boric and sulfuric acids.

3. The method of producing light colored resins from oil containing polymerizable constituents of the styrene-coumarone-indene type which comprises the step of adding to said oil sulfuric acid of 82 to 100% concentration having boric acid dissolved therein.

4. The method of producing light colored resins from oil containing polymerizable constituents of the styrene-coumarone-indene type which comprises the step of adding to said oil sulfuric acid of 82 to 100% concentration having boric acid dissolved therein while maintaining the temperature of the mixture below about 25° C.

5. The method of producing light colored resins from oil containing polymerizable constituents of the styrene-coumarone-indene type which comprises the step of adding to said oil concentrated sulfuric acid having boric acid dissolved therein.

6. The method of producing light colored resins from oil containing polymerizable constituents of the styrene-coumarone-indene type which comprises the step of adding to said oil a mixture of boric and sulfuric acids containing up to 15 per cent of boric acid.

7. The method of producing light colored resins from oil containing polymerizable constituents of the styrene-coumarone-indene type which comprises adding to said oil a mixture of concentrated sulfuric acid and boric acid containing from about 4 to 10% of boric acid.

8. The method of producing light colored resins from oil containing polymerizable constituents of the styrene-coumarone-indene type which comprises the step of adding to said oil about 5 per cent or less by weight of a mixture containing sulfuric and boric acids.

9. The method of producing light colored resins from oil containing polymerizable constituents of the styrene-coumarone-indene type which comprises adding to said oil about 5 per cent or less by weight of a mixture of sulfuric acid and boric acid containing up to about 15% by weight of boric acid.

10. The method of producing light colored resins from oil containing polymerizable constituents of the styrene-coumarone-indene type which comprises adding to said oil about 2 per cent by weight of a mixture of concentrated sulfuric acid and from about 4 to 10 per cent by weight of boric acid based on the weight of the mixture of concentrated sulphuric acid and boric acid.

11. The method of treating oil containing polymerizable constituents of the styrene-coumarone-indene type which comprises the step of adding to said oil boric acid in solution in sulfuric acid in amount insufficient to polymerize substantially all of the polymerizable constituents of the oil.

12. The method of treating oil containing polymerizable constituents of the styrene-coumarone-indene type which comprises the step of adding to said oil a mixture of boric and sulfuric acids containing from 1 to 15 per cent of boric acid in solution in concentrated sulfuric acid in amount insufficient to polymerize substantially all of the polymerizable constituents of the oil.

13. The method of producing light colored resins from oil containing polymerizable constituents of the styrene-coumarone-indene type which comprises adding to the oil about 1 per cent or less by weight of a mixture of boric and sulfuric acids containing from 6 to 10 per cent of boric acid in solution in concentrated sulfuric acid, separating the acid from the oil, and thereafter polymerizing constituents of the oil separated.

14. The method of producing light colored resins from oil containing polymerizable constituents of the styrene-coumarone-indene type which comprises the step of adding to said oil a mixture of boric and sulfuric acids, while maintaining the mixture within the temperature limits of about —10° C. and 20° C.

15. The method of producing light colored resins which comprises mixing about 20 parts by weight of a mixture of boric and sulfuric acids containing 16 parts of concentrated sulfuric acid and 4 parts of ortho-boric acid ($H_3BO_3$) with 1000 parts of a coal tar distillate oil boiling between 75° C. to 230° C., containing up to 60 per cent of polymerizable constituents and less than about .10 per cent of tar acids while maintaining the temperature of the mixture during operation within the temperature limits of about —10° C. and 20° C.

16. The method of producing light colored resins of high melting point which comprises mixing about 20 parts by weight of a mixture containing 92 parts of concentrated sulfuric acid and 8 parts of meta-boric acid ($HBO_2$) with 1000 parts of a coal tar distillate oil boiling between 75° C. to 230° C., containing polymerizable constituents and less than about .1 per cent of tar acids while maintaining the temperature during operation between about —5° C. and +20° C.

17. The method of producing light colored para-coumarone resins from oil containing constituents which tend to darken the resin, which comprises mixing about 20 parts by weight of a mixture of boric and sulfuric acids containing 4 to 10 per cent by weight of meta-boric acid and 90 to 96 per cent of concentrated sulfuric acid with 1000 parts by weight of a coal tar fraction boiling within the limits of 75° C. and 230° C., neutralizing and distilling the treated oil, and thereafter polymerizing constituents of the distillate to obtain a light colored resin therefrom.

18. The method of producing light colored resins from oil containing polymerizable constituents of the styrene-coumarone-indene type which comprises adding boric acid and sulfuric acid to such oil having a tar acid content of not more than .05%.

KARL HENRY ENGEL.